(12) United States Patent
Sugimoto

(10) Patent No.: US 7,338,059 B2
(45) Date of Patent: Mar. 4, 2008

(54) BICYCLE DRIVE UNIT

(75) Inventor: Masanori Sugimoto, Sayama (JP)

(73) Assignee: Shimano Inc., Osaka (JP)

( * ) Notice: Subject to any disclaimer, the term of this patent is extended or adjusted under 35 U.S.C. 154(b) by 97 days.

(21) Appl. No.: 11/037,366

(22) Filed: Jan. 19, 2005

(65) Prior Publication Data
US 2005/0217914 A1 Oct. 6, 2005

(30) Foreign Application Priority Data
Apr. 2, 2004 (JP) .............................. 2004-110176

(51) Int. Cl.
*B62M 1/02* (2006.01)
(52) U.S. Cl. ........................ 280/260; 180/207; 180/220
(58) Field of Classification Search ...... 180/65.1–65.3, 180/65.5, 65.6, 203–207, 220, 208
See application file for complete search history.

(56) References Cited

U.S. PATENT DOCUMENTS

| | | | | | |
|---|---|---|---|---|---|
| 4,277,077 | A | * | 7/1981 | Ozaki | 280/236 |
| 4,936,597 | A | * | 6/1990 | Hartmann | 280/231 |
| 5,758,736 | A | * | 6/1998 | Yamauchi | 180/220 |
| 5,873,590 | A | * | 2/1999 | Abe et al. | 280/259 |
| 5,976,052 | A | * | 11/1999 | Lenoble | 475/297 |
| 6,012,538 | A | * | 1/2000 | Sonobe et al. | 180/220 |
| 6,056,307 | A | * | 5/2000 | Busby et al. | 280/284 |
| 6,155,369 | A | * | 12/2000 | Whittaker | 180/220 |
| 6,296,072 | B1 | * | 10/2001 | Turner | 180/220 |
| 6,361,059 | B1 | * | 3/2002 | Ellsworth | 280/284 |
| 6,598,693 | B2 | * | 7/2003 | Honda et al. | 180/205 |
| 6,684,971 | B2 | * | 2/2004 | Yu et al. | 180/205 |
| 7,059,620 | B2 | * | 6/2006 | Chamberlain et al. | 280/284 |
| 7,104,562 | B2 | * | 9/2006 | Schmider et al. | 280/284 |
| 2002/0167151 | A1 | | 11/2002 | Tseng et al. | |

FOREIGN PATENT DOCUMENTS

| | | |
|---|---|---|
| DE | 880712 | 6/1953 |
| DE | 3804342 A1 | 8/1989 |
| DE | 19840576 | 3/2000 |
| GB | 150806 | 9/1920 |
| JP | 52-162643 | 6/1976 |
| JP | 04-138988 | 5/1992 |
| JP | 07-215259 | 8/1995 |
| JP | 09-216594 | 8/1997 |
| JP | 10-236372 | 9/1998 |
| JP | 2000-069731 | 3/2000 |
| JP | 2003-267288 | 9/2003 |
| JP | 2003-269248 | 9/2003 |
| WO | WO-01/214741 A1 | 3/2001 |

\* cited by examiner

*Primary Examiner*—Lesley D. Morris
*Assistant Examiner*—Maurice Williams
(74) *Attorney, Agent, or Firm*—Global IP Counselors, LLP

(57) ABSTRACT

A bicycle drive unit is disclosed that includes a case frame, crank shaft, front sprocket, rear hub shaft and rear sprocket. The crank shaft includes first and second support portions that are spaced apart from one another and are supported on opposite lateral sides of a forward portion of the case frame. The first and second support portions are engaged with bearings supported on opposite sides of the interior of the case frame. The front sprocket is installed on the crank shaft within the case frame and between the first and second support portions. The rear hub shaft includes a third and fourth supporting portions that are spaced apart from one another with the rear sprocket installed on the rear hub shaft therebetween.

19 Claims, 7 Drawing Sheets

BICYCLE DRIVE UNIT

CROSS-REFERENCE TO RELATED APPLICATIONS

This application claims priority to Japanese Patent Application No. 2004-110176, filed Apr. 2, 2004. The entire disclosure of Japanese Patent Application No. 2004-110176 is hereby incorporated herein by reference.

BACKGROUND OF THE INVENTION

1. Field of the Invention

The present invention relates to a bicycle drive unit, especially to a bicycle drive unit that is mounted onto a bicycle frame, and supports a rear wheel.

2. Background Information

A bicycle is usually equipped with a frame and a drive component that includes right and left cranks mounted onto the frame in a freely rotatable manner. Front and rear wheels are typically mounted onto front and rear portions of the frame.

Some bicycles include a modular drive unit that is connected to only the drive component and a mid-portion of the frame, with the rear wheel mounted to the modular drive unit instead of the rear portion of the frame. An example of such a modular drive unit is well known in, for instance, Official Gazette of Germany No. 19840576. By utilizing a bicycle drive unit, the assembling efficiency of such a bicycle is improved, and assembling costs are reduced. Furthermore, because the chain is concealed within the modular drive unit, it is not exposed to the elements. Further, since the chain is not exposed, the chain cannot stain a bicycle rider's clothes, and is also maintenance-free.

A typical bicycle drive unit, such as that disclosed in Official Gazette of Germany No. 19840576, includes a supporting frame or case frame that serves as a rear portion of the frame. Specifically, the rear wheel is completely supported on the case frame. A forward portion of the case frame is pivotally fixed to a mid-portion of the bicycle frame and is also fitted with a crank shaft. Right and left ends of the crank shaft are fitted with right and left cranks that the bicycle rider engages to generate rotary power for the bicycle. A rear hub is fitted in a rearward portion of the case frame with the rear wheel mounted to the rear hub. The case frame is at least partially hollow. A front sprocket is fitted onto the right crank and is disposed within the case frame adjacent to the right crank. A rear sprocket is mounted onto the rear-hub and is also disposed within the case frame. A chain within the case frame wraps around the front and rear sprockets for transmitting rotary power therebetween.

The case frame undulates with respect to the bicycle frame so as to move like a see-saw pivoting in response to bumps on the road or the like. The case frame includes a cylindrical crank supporting portion that extends laterally outwardly in order to support right and left bearings that in turn support the crank shaft. The front sprocket is located on an outward side of the right side bearing. Specifically, the front sprocket is not located between the right and left bearings, but is located on an outboard side of the right side bearing on the crank shaft adjacent to the right crank.

In the conventional bicycle drive unit, the front sprocket is mounted onto the right crank at a position outward from the right side bearing. As a result, it is necessary to design the crank shaft and cranks with considerable strength due to the torsion angles of the crank shaft and cranks. Specifically, the distance between end of the left crank and the front sprocket is such that considerable stress placed upon the crank shaft and crank. Therefore, the size of the crank shaft and crank must be increased in order to withstand typical pedaling forces, thereby increasing the overall mass of the bicycle. Furthermore, the width of the case frame is relatively narrow with inclusion of the crank supporting portions that extend laterally outward. This reduces the torsional rigidity of the case frame. Therefore, any efforts to maintain torsional rigidity of the case frame would typically require a corresponding increase in the weight of the case frame, which is counter to current efforts to decrease the weight of bicycles.

Moreover, because the crank extends from the front sprocket, a large opening must be formed in the side of the case frame. Therefore, demands on seals of the case frame are increased, typically contributing to the leakage of lubricant out of the case frame.

In view of the above, it will be apparent to those skilled in the art from this disclosure that there exists a need for an improved modular drive unit that includes a design that increases torsional stability and sealability of the drive unit. This invention addresses this need in the art as well as other needs, which will become apparent to those skilled in the art from this disclosure.

SUMMARY OF THE INVENTION

The purpose of the present invention is to provide a bicycle drive unit with a design that improves strength of bicycle assembly, decreases the weight of the entire bicycle, and improving sealing against lubricant leakage.

Accordingly, in one aspect of the present invention, a bicycle drive unit is arranged and configured for mounting onto a bicycle frame and for receiving and supporting a rear wheel. The bicycle drive unit includes a case frame, a crank shaft, a front sprocket, a rear hub shaft, a rear sprocket, a one-way clutch, and a chain. The case frame includes first and second case components that define an interior space. The case frame has a forward portion and a rearward portion. The case frame further extends along a first direction and defines a perpendicular second direction that intersects the first direction. The crank shaft is formed with first and second rotation supporting portions that are installed in the forward portion of case frame and extending generally in the second direction. The first and second rotation supporting portions are spaced apart from one another and are supported by respective ones of the first and second case components in a freely rotatable manner. The crank shaft is also formed with first and second crank supporting portions that extend outwardly from the first and second rotation supporting portions in the second direction, and also extend outside of the case frame. The front sprocket is mounted on the crank shaft between the first and second supporting portion in a non-rotatable manner.

The rear hub shaft is formed with third and fourth rotation supporting portions that are spaced apart from one another and supported in a rearward portion of the case frame. Each of the third and fourth rotation supporting portions is supported by respective ones of the first and second case components of the case frame in a freely rotatable manner. The rear hub shaft is further formed with a wheel support portion that extends outwardly from one of the third and fourth supporting portions and outside of the first case component. The wheel supporting portion extends generally in the second direction and is arranged and configured to mount the rear wheel. The rear sprocket is mounted on the rear hub shaft in a freely rotatable manner within the case frame and includes at least one sprocket gear ring. The one-way clutch is mounted onto the rear hub shaft and transmits rotational energy in one rotational direction only from the rear sprocket to the rear hub shaft.

In the drive unit of the present invention, when bicycle pedals are pushed with the drive unit mounted onto a bicycle, the cranks are rotated, which rotates the crank shaft. This in turn rotates the front sprocket, which rotates the rear sprocket through the chain, which thereupon rotates the rear wheel, and pushes the bicycle forward. In the crank rotations stated above, the front sprocket is not mounted onto the right crank outward of the supporting portions, but is rather, the front sprocket is mounted between the first and second rotational supporting portions. The arrangement of the present invention is different from the structure seen in prior art bicycles. With the configuration of the present invention, it is possible to shorten the distance from the left crank supporting portion to the front sprocket, as compared to prior art configurations. Thus, it is possible to maintain a desirable torsion angle and reduce the rigidity of the crank shaft.

Further, the crank shaft is supported by the frontward portions of the first and second case components at the first and second rotation supporting portions, and the rear hub shaft is supported by the rearward portion of the first and second case components at the third and fourth supporting portions. Therefore, the width of the case frame in an axial direction becomes longer. In other words, the width is increased thereby increasing the torsional rigidity of the case frame.

In the present invention, because the front sprocket is installed between the first and second rotational supporting portions, it becomes possible to maintain strength and yet reduce the weight of the crank shaft. Furthermore, the crank shaft and the rear hub shaft are supported on forward and rearward portions, respectively, of the case frame by the first and second rotation supporting portions and by the third and fourth supporting portions. Since the first and second rotation supporting portions and the third and fourth supporting portions are spaced apart from one another, it is possible to maintain a high level of torsional rigidity, even with reductions in the weight of the case frame. Thus, the weight of the entire bicycle can be reduced. Moreover, because the front sprocket is installed between the first and second rotational supporting portions, the sealing structure around the crank shaft can be simplified, which increases sealability.

The drive unit of the present invention can further include an undulating supporting bracket installed on a forward portion of the case frame for mounting the case frame onto the bicycle frame, so that the case frame moves in an undulating manner like a see-saw. By mounting the drive unit onto the frame so that the drive unit undulates, it is possible to change the mounting position of the drive unit to fit a variety of frame designs.

The drive unit of the present invention can further include a suspension unit which is mounted at a location spaced apart from the center of undulation of the undulating supporting bracket and the bicycle frame. It is therefore possible to cause the drive unit to undulate in response to road conditions improving the ride and comfort of the rider.

The drive unit of the present invention can further be configured such that the rear-sprocket is installed between the third and the fourth supporting portion. With the rear sprocket is installed between the third and fourth supporting portions, the sprocket is supported on both sides thereof. It is possible to maintain strength of the rear hub shaft, and reduce weight more efficiently compared to prior art configurations. Moreover, because the rear sprocket is installed between the third and fourth supporting portions, the sealing structure of the rear hub shaft is simplified, which allows for improved seal design for the drive unit.

The drive unit of the present invention can further be configured such that the rear sprocket is a multiple-stage sprocket with multiple gear rings, and is further equipped with a chain guide derailleur that is installed onto an interior surface of the case frame. Consequently, the rear derailleur is completely enclosed inside the case frame.

The drive unit of the present invention can further include a tensioning assembly installed on the inner side of the case frame, which applies tension to the chain. The chain housed within the case frame becomes highly resistant to loosening, and is less likely to become disengaged from either of the front and rear sprockets.

The drive unit of the present invention can further include be configured such that the rear hub shaft is equipped with a rotor support portion, onto which a disk rotor is mountable in a non-rotatable manner at a position between the third supporting portion and the rear wheel support portion. It is therefore possible to mount the disk rotor of the disk brake directly onto the rear hub shaft.

The drive unit of the present invention can further include be configured such that the case frame includes a caliper carrier on an outer surface thereof adjacent to the disk rotor. A braking disk caliper that includes a piston is mounted on the caliper carrier. It is therefore possible to more accurately install the disk rotor and the caliper.

The drive unit of the present invention can further include a generator installed around the rear hub shaft within the case frame. The generator can generate electricity from rotation of the rear hub shaft. Since the generator is installed inside the case frame, it is possible to utilize the generator as the electrical power source for various mechanisms, such as lamps, derailleurs, and suspension elements, and their controllers.

The drive unit of the present invention can further include a drive mechanism installed around the crank shaft housed in the case frame, which rotates and drives the crank shaft. It is therefore possible to make a motor-driven bicycle that includes motor assisted driving force.

According to the present invention, with the front sprocket is installed between the first and second rotation supporting portions, it is possible to maintain the strength of the crank shaft and yet reduce its weight. Furthermore, the crank shaft and the rear hub shaft are supported on right and left side of the case frame by the first and second supporting portions, and by the third and fourth supporting portions, respectively, which are spaced apart from one another. Therefore, it is possible to maintain a high level of torsional rigidity even if the weight of the case frame is reduced. Thus, the weight of the entire bicycle can be reduced. Moreover, because the front sprocket is installed between the first and second supporting portions, the sealing structure of the crank shaft edge is simplified compared to the prior art, which increases sealability.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
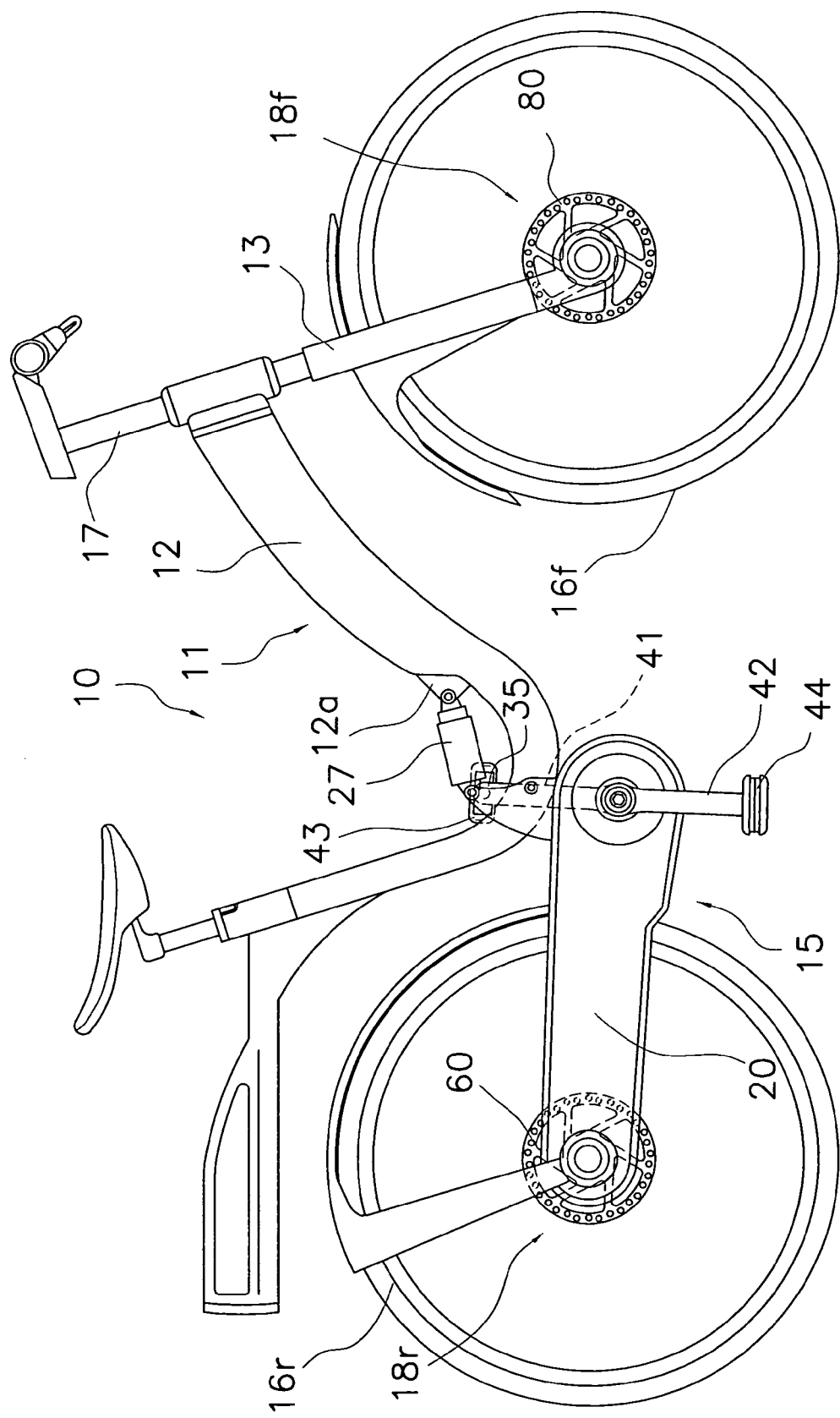
FIG. 1 is a side view of a bicycle with a drive unit in accordance with one embodiment of the present invention.

Referring initially to FIG. 1, a bicycle 10 that includes a bicycle frame 11 is illustrated in accordance with a first embodiment of the present invention.

In FIG. 1, the frame 11 of the bicycle 10 includes a skeleton frame 12 and a suspension fork 13. The skeleton frame 12 is formed of a plurality pipes that are welded or otherwise non-movably fixed to one another to form a V-shaped structure. The skeleton frame 12 further supports one embodiment of the present invention, as described below. The suspension fork 13 is pivotally mounted within a forward portion of the skeleton frame 12.

The bicycle 10 is furthermore equipped with drive unit 15, front and rear wheels 16f and 16r, a handlebar 17 and front and rear disk brakes 18f and 18r, in accordance with the present invention. The drive unit 15 is mounted onto a lower portion of skeleton frame 12. The rear wheel 16r is mounted onto the rear portion of the drive unit 15. The handlebar 17 is connected to an upper portion of suspension fork 13. The front and rear disk brakes 18f and 18r are mounted to the front and rear wheels 16f and 16r, respectively. The front and rear wheels 16f and 16r are preferably tubeless tire structures.

The suspension fork 13 is mounted in a freely rotatable manner around a diagonally extending shaft that is supported in a forward portion of the skeleton frame 12 in a conventional manner. A lower forward portion of the suspension fork 13 further supports the front wheel 16f. The drive unit 15 supports the rear wheel 16r on one side thereof.

Figure 2:
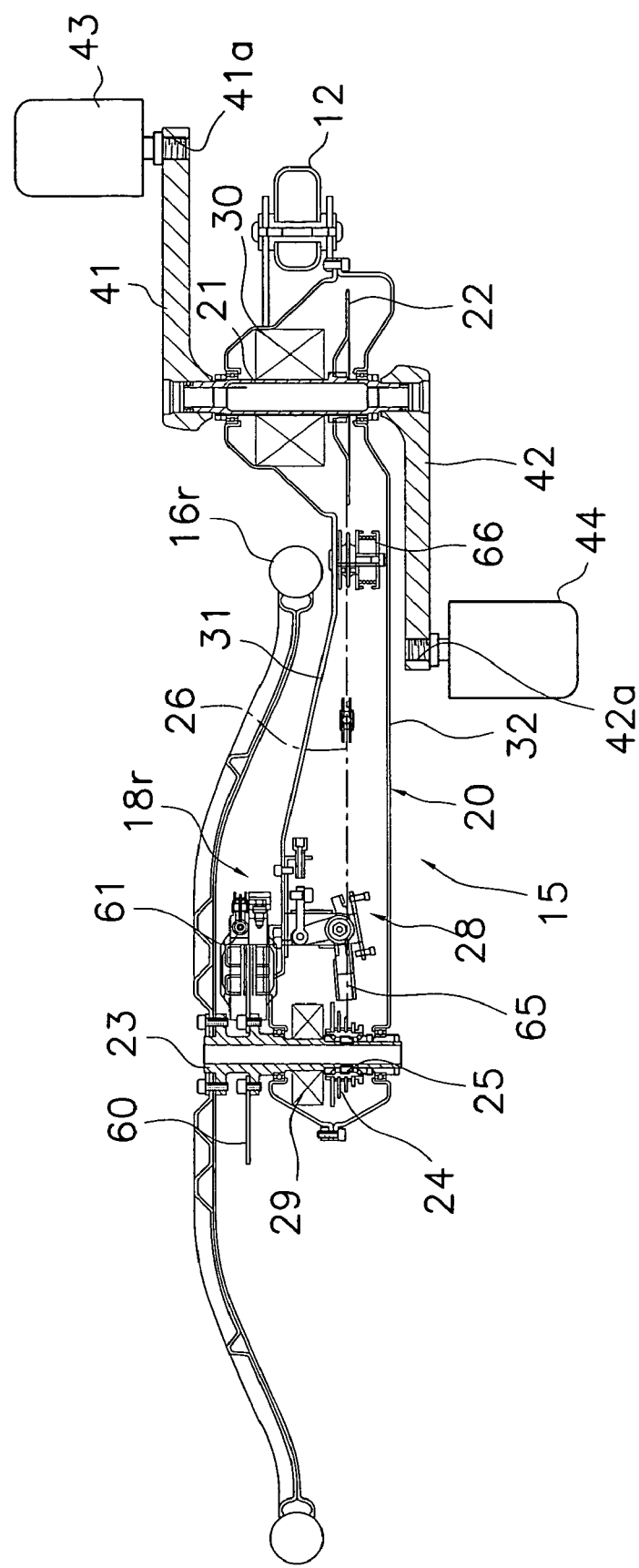
FIG. 2 is a cross-sectional view of the drive unit depicted in FIG. 1, in accordance with the present invention.

As shown in FIGS. 1 and 2, drive unit 15 includes a case frame 20, a crank shaft 21, a front sprocket 22, rear hub shaft 23, a rear sprocket 24, a one-way clutch 25, a chain 26, a suspension unit 27, a rear gear shifter 28, a generator 29 and a driving mechanism 30.

The case frame 20 is mounted onto a curved portion of skeleton frame 12 of the frame 11 so that the case frame 20 is movable in an undulating manner like a see-saw. The crank shaft 21 is supported by a first edge (a front edge shown on the right of FIG. 2) of the case frame 20 in a freely rotatable manner. The front sprocket 22 is non-rotatably mounted onto the crank shaft 21 in a manner described in greater detail below. The rear hub shaft 23 is supported by a second edge (a rear edge shown on the left of FIG. 2) of the case frame 20 in a freely rotatable manner. The rear sprocket 24 is equipped with, for example, four axially spaced gears 24a, 24b, 24c and 24d (see FIG. 4) and is mounted onto rear hub shaft 23 in a freely rotatable manner. The one-way clutch 25 transmits rotational movement in one direction of rotation of the rear sprocket 24 to rear hub shaft 23. The chain 26 is installed within the case frame 20, wrapping around both of the front and rear sprockets 22 and 24. The rear disk brake 18r, the suspension unit 27, the rear gear shifter 28, the generator 29 and the driving mechanism 30 are all mounted onto the case frame 20, as shown in the drawings and described below.

As shown in FIGS. from 1 to 6, the case frame 20 includes first and second case components 31 and 32. As shown in FIG. 2, the first and second case components 31 and 32 define an internal space that extends in a first direction generally corresponding to a horizontal direction of the bicycle 10. The first and second case components 31 and 32 are coupled to one another along a vertical plane relative to the bicycle 10.

The case frame 20 includes a forward portion and a rearward portion. At the forward portion of the case frame 20, the first case component 31 has a width that is greater than the width of the rearward portion of the first case component 31. The width of the case frame 20 extends in a second direction perpendicular to the first direction. The second direction is a generally horizontal direction relative to the bicycle 10. The crank shaft 21 extends generally in the second direction.

Figure 3:
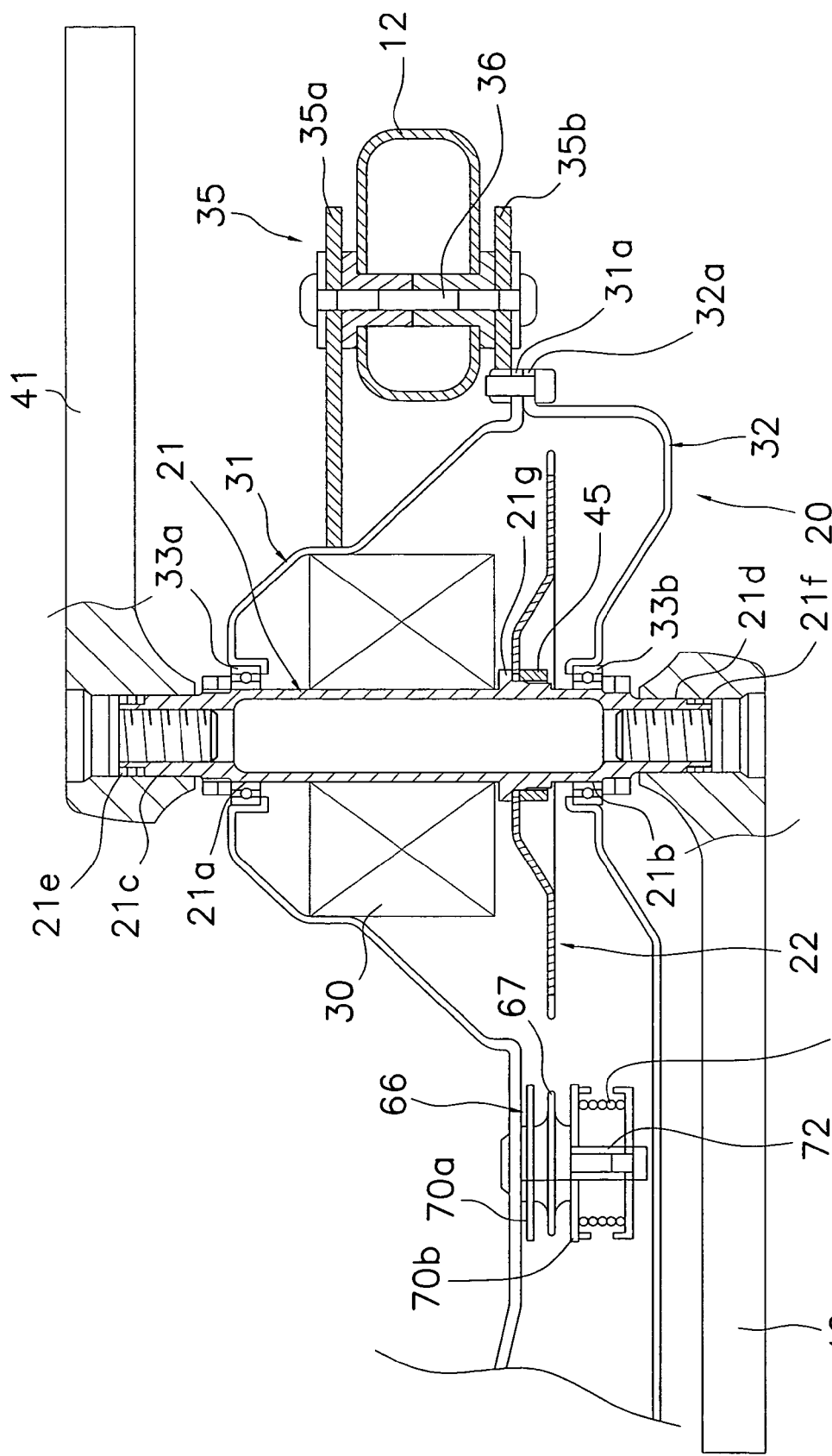
FIG. 3 is an enlarged cross-sectional view of the forward portion of the drive unit, in accordance with the present invention.
Figure 4:
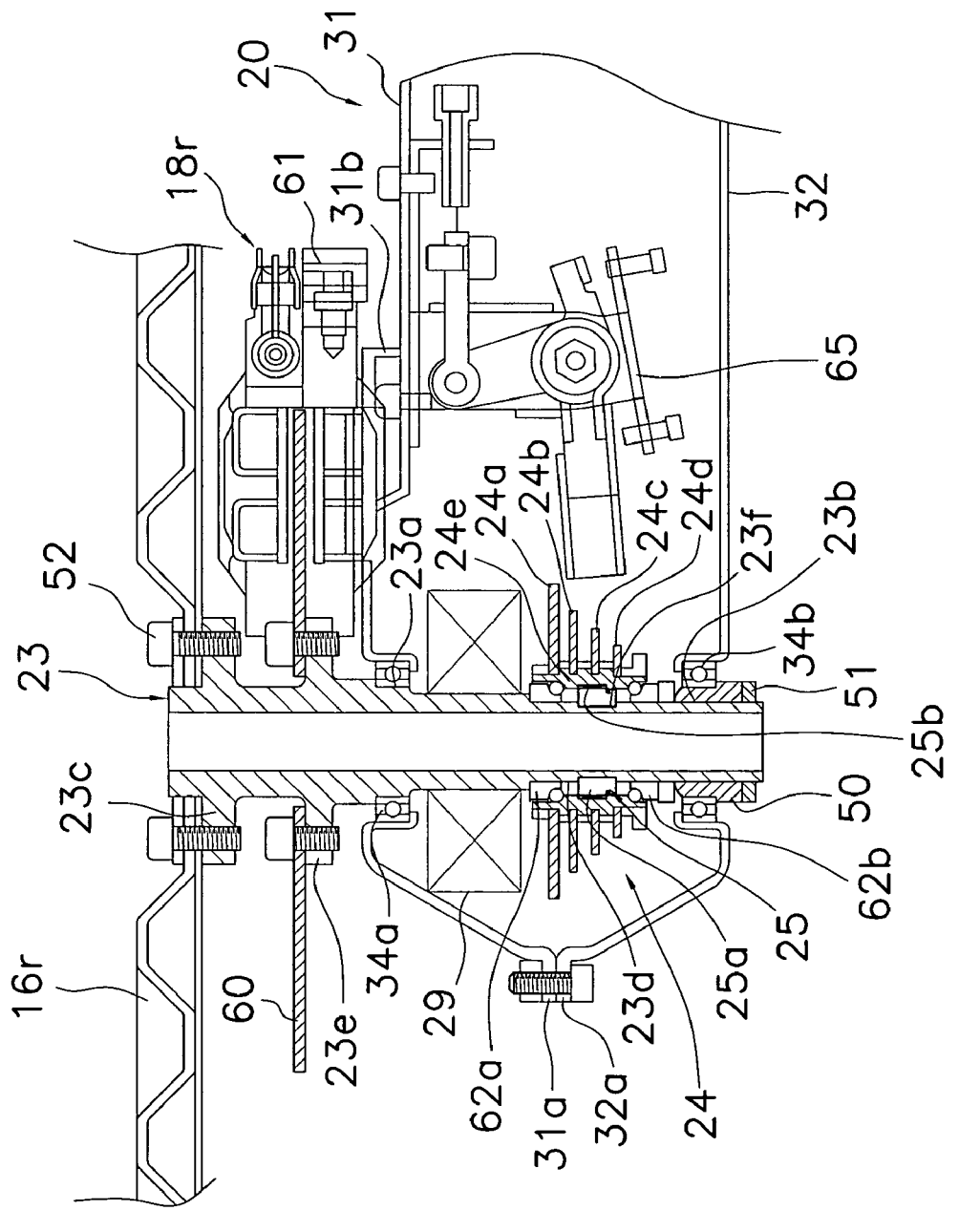
FIG. 4 is an enlarged cross-sectional view of the rearward portion of the drive unit, in accordance with the present invention.
Figure 6:
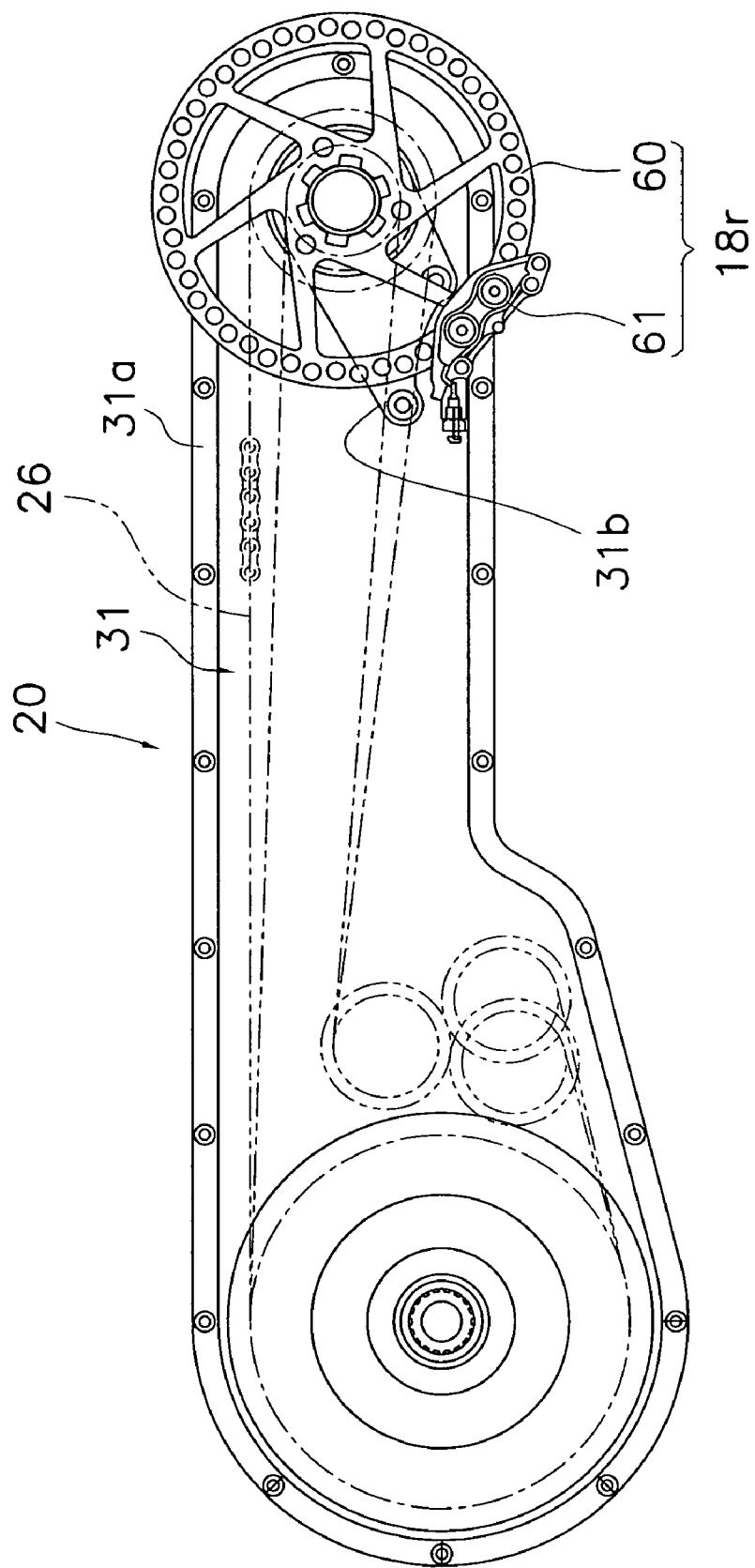
FIG. 6 is a side view of the drive unit looking from a left side of the bicycle, in accordance with the present invention.

The first case component 31 functions as a chain stay or chain retainer, similar to a chain retainer a conventional bicycle. The forward portion of the first case component 31 houses the driving mechanism 30. As shown in FIG. 3, the forward portion of the first case component 31 also supports a first bearing 33a. The first bearing 33a in turn supports the crank shaft 21 in a freely rotatable manner. As shown in FIG. 4, the rearward portion of the first case component 31 supports a third bearing 34a. The third bearing 34a supports the rear hub shaft 23 in a freely rotatable manner. A caliper carrier 31b (see FIGS. 4 and 6) is formed on the rearward portion of the first case component 31 slightly forward of third bearing 34a. The caliper carrier 31b can be an integral part of the first case component 31 or can be a separate element welded or otherwise non-movably fixed to the first case component 31. A caliper 61 is supported by the caliper carrier 31b for selective engagement with the rear disk brake 18r.

As shown in FIGS. 1 and 3, a support bracket 35 is attached to the first case component 31. The support bracket 35 is also attached to a lower curved portion of the skeleton frame 12 thereby allowing the first case component 31 to move in an undulating manner like a see-saw relative to the skeleton frame 12. The support bracket 35 includes a pair of bracket plates 35a and 35b as shown in FIG. 3. Preferably, lower base edges of the bracket plates 35a and 35b are welded to first case component 31. A pivot pin 36 extends through a lower portion of the skeleton frame 12 and the bracket plates 35a and 35b thereby supporting the skeleton frame 12. The support bracket 35 is therefore pivotal (undulates) about the pivot pin 36 relative to the skeleton frame 12. An upper portion of the support bracket 35 is connected to the suspension unit 27, as shown in FIG. 1 thereby restricting the pivotal (undulating) movement of the first case component 31 and serving as a shock absorber.

The second case component 32 functions as a chain case to protect the chain 26 and also serves as a chain stay or chain retainer in tandem with the first case component 31. The second case component 32 also includes a forward portion and a rearward portion shown in FIGS. 3 and 4, respectively. A second bearing 33b is supported in the forward portion of the second case component 32. The second bearing 33b supports the crank shaft 21 in a freely rotatable manner. The rearward portion of the second case component 32 supports a fourth bearing 34b. The fourth bearing 34b supports rear hub shaft 23 in a freely rotatable manner. The first, second, third and fourth bearings 33a, 33b, 34a, and 34b are, for example, ball bearings. Preferably, the first, second, third and fourth bearings 33a, 33b, 34a, and 34b are all sealed ball bearings which are equipped with a seal at least on an outward side thereof.

Figure 5:
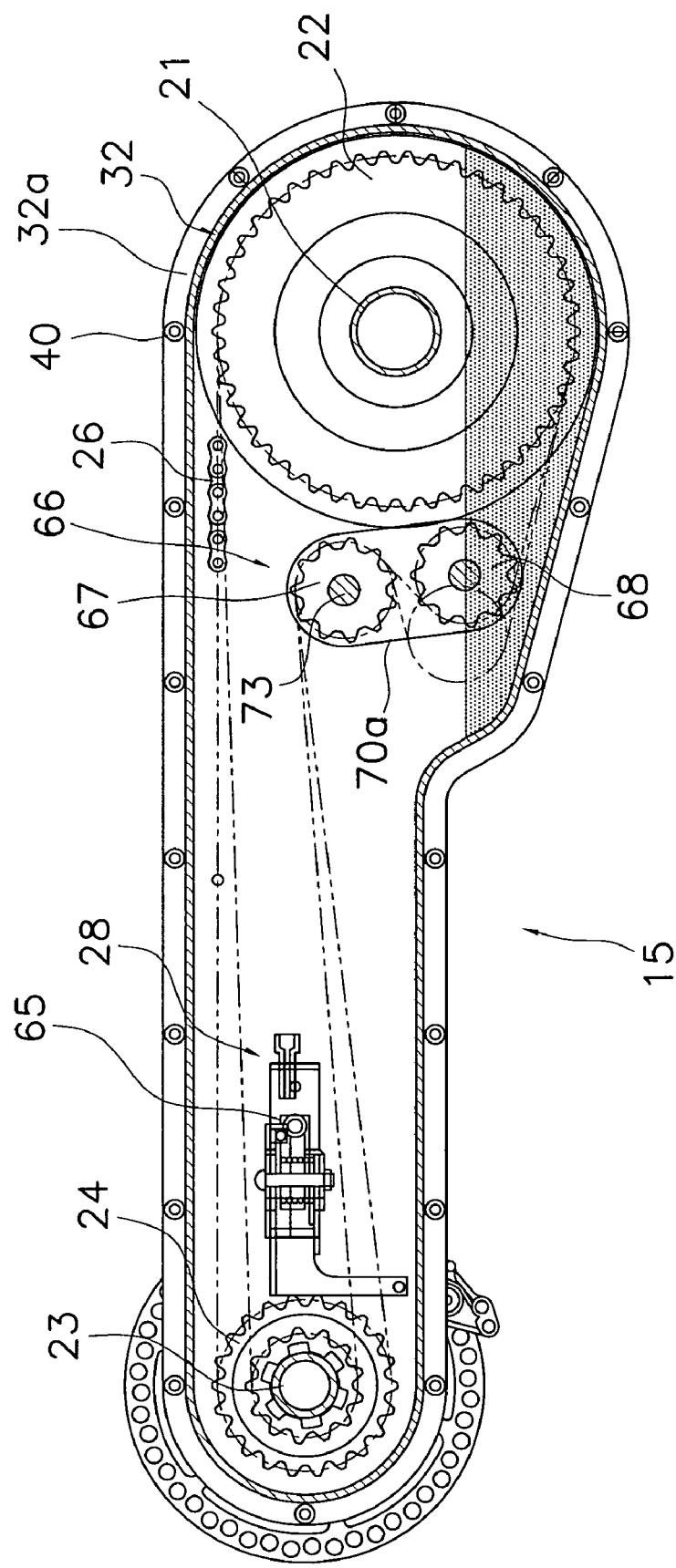
FIG. 5 is a side cross-sectional of the drive unit looking from a right side of the bicycle, in accordance with the present invention.

The first and second case components 31 and 32 are formed with corresponding mating flanges 31a and 32a, respectively, that face one another when the first and second case components 31 and 32 are assembled together. The first and second case components 31 and 32 are attached to one another by a plurality of bolts 40, shown in FIG. 5. The bolts 40 extend through bolt holes formed in the mating flanges 31a and 32a. A seal or packing material (not shown) is disposed between the mating flanges 31a and 32a to provide a fluid-tight seal between the first and second case components 31 and 32. As shown in FIG. 5, a lubricant, such as machine oil, is inserted into the internal space defined by the first and second case components 31 and 32 to lubricate the chain 26 and other components within the first and second case components 31 and 32 and the case frame 20.

As shown in FIG. 3, the crank shaft 21 is a hollow shaft that is formed with first and second support portions 21a and 21b, first and second crank carrier portions 21c and 21d and threaded portions 21e and 21f. The crank shaft 21 is installed in the forward portion of the case frame 20 such that the first and second support portions 21a and 21b of the crank shaft 21 are freely rotatably supported by the first and second bearings 33a and 33b, respectively.

The first and second crank carrier portions 21c and 21d extend outwardly from the first and second support portions 21a and 21b and further extending laterally outside of the case frame 20. Adjacent to the second support portion 21b, but between the first and second support portions 21a and 21b, the crank shaft 21 is also formed with a sprocket support portion 21g that is dimensioned to mount and support the front sprocket 22, as shown in FIG. 3. The sprocket support portion 21g has an outer diameter that is greater than the diameters of the first and second support portions 21a and 21b.

The first and second crank carrier portions 21c and 21d are circular shaped but are tapered extending outwardly toward the first and second crank carrier portions 21c and 21d and the threaded portions 21e and 21f. Right and left cranks 41 and 42 are mounted onto the first and second crank carrier portions 21c and 21d, respectively, as shown in FIGS. 2 and 3. Further, the right and left cranks 41 and 42 engage the threaded portions 21e and 21f. Foot pedals 43 and 44 are mounted at distal ends of the right and left cranks 41 and 42, respectively, as shown in FIG. 2. Specifically, the foot pedals 43 and 44 engage threaded portions 41a and 42a formed in respective cranks 41 and 42. Typically, the foot pedal 43 and the threaded portions 41a are formed with screw threads that wind in a first threading direction (i.e. left handed threads) and the foot pedal 44 and threaded portion 42a are formed with screw threads that wind in a second threading direction (i.e. right handed threads) opposite the first threading direction.

The front sprocket 22 is mounted onto sprocket support portion 21g in an non-rotatable manner. Specifically, front sprocket 22 is mounted in a non-rotatable manner by means a mounting nut 45 that is screwed onto the screw threads (not shown) of the sprocket support portion 21g.

As shown in FIG. 4, the rear hub shaft 23 is formed with third and fourth support portions 23a and 23b, wheel support portion 23c, a sprocket support portion 23d, a rotor support portion 23e and mounting recess 23f. The third and fourth support portions 23a and 23b are formed at laterally spaced positions on the rear hub shaft 23 for supporting the rear hub shaft 23 within the rearward portion of the case frame 20. Specifically, the third support portion 23a is rotatably supported in the first case component 31 and the fourth support portion 23b is rotatably supported in the second case component 32. The rear wheel 16r is supported on the wheel support portion 23c. The sprocket support portion 23d is formed between the support portions 23a and 23b, but adjacent to the support portion 23b.

The third bearing 34a supports the third support portion 23a. The fourth bearing 34b is threadedly engaged with an adaptor 50 that is in turn supported by the fourth support portion 23b. The adapter 50 is held in a non-rotating manner by a lock nut 51. The wheel support portion 23c has a circular plate or disk shape, extending radially outwardly from the rear hub shaft 23 laterally outwardly from the third support portion 23a and the first case component 31. The wheel support portion 23c supports and holds a central portion of the rear wheel 16r in tandem with mounting bolts 52.

The rotor support portion 23e of the rear hub shaft 23 is formed between the wheel support portion 23c and the third support portion 23a. The rotor support portion 23e is circular plate-like shaped protrusion that is dimensioned to support a disk rotor 60 of the rear disk brake 18r in tandem with a plurality of fasteners. The mounting recess 23f is formed with corrugations adjacent to the sprocket support portion 23d for engagement with a clutch claw 25a of the one-way clutch 25. Furthermore, a generator 29 is mounted on the rear hub shaft 23 between the third support portion 23a and the sprocket support portion 23d.

The rear sprocket 24 is, for example, a multiple-stage sprocket, which is equipped with a plurality of sprocket gears, such as the four gears 24a, 24b, 24c and 24d which are all non-rotatably fixed to a boss 24e. The rear sprocket 24 is supported on the rear hub shaft 23 via a pair of bearings 62a and 62b in a freely rotatable manner. Bearings 62a and 62b are preferably well-known angular ball bearings that are equipped with an inner ring, an outer ring, and multiple steel balls.

The one-way clutch 25 is a claw-type clutch that is includes the above mentioned clutch claw 25a and a plurality of ratchet teeth 25b that are formed on an inner perimeter of Boss 24e. The clutch claw 25a is biased into engagement with the ratchet teeth 25b by a spring (not shown). The one-way clutch 25 allows rotation of the rear sprocket 24 in only rotational direction relative to the rear hub shaft 23.

As shown in FIG. 5, the chain 26 is installed to selectively engage one of the gears 24a, 24b, 24c and 24d of the rear sprocket 24 and further engages the front sprocket 22 in order to transmit rotational power from the cranks 41 and 42 to rear sprocket 24.

As shown in FIG. 1, the suspension unit 27 is a damper which utilizes, for example, oil pressure, air pressure, or a coil spring. One end of the suspension unit 27 is mounted onto the support bracket 35, and another end of the suspension unit 27 is mounted to a mounting part 12a formed onto skeleton frame 12.

As shown in FIGS. 4 and 5, the rear gear shifter 28 includes a chain guide derailleur 65 that selectively guides the chain 26 to any of four gears 24a, 24b, 24c or 24d. The chain 26 is engaged and maintained in position by a chain tension assembly 66 that is installed on an inner side of the second case component 31 of the case frame 20. The chain guide derailleur 65 is mounted onto the second case component 31 via a support shaft that is spaced apart from the rear hub shaft 23 (shown in FIG. 4) so that the chain guide derailleur 65 moves in an undulating manner. The chain guide derailleur 65 is controlled by a gear shifter (not shown) via a gear cable (not shown) that selectively positions the chain guide derailleur at any one of four derailleur positions to move the chain 26 to any one of the gears 24a, 24b, 24c or 24d.

As shown in FIGS. 3 and 5, the chain tension assembly 66 is supported on a fixed shaft 73 that is non-movably secured to the first case component 31 rearward of the front sprocket 22. The fixed shaft 73 supports first pulley 67 and a pair of plates 70a and 70b. The plates 70a and 70b are freely rotatable about the fixed shaft 73. The plates 70a and 70b are further support an undulating shaft 72. A second pulley 68 is rotatably supported by the undulating shaft 72. The plates 70a and 70b are biased by a torsion coil spring 71 that is installed on an outer perimeter of the undulating shaft 72, in the clockwise direction shown in FIG. 5. As a result of the biasing of the torsion coil spring 71, the chain 26 is maintained in engagement with any of the selected gears 24a, 24b, 24c or 24d since the chain 26 is guided by the chain guide derailleur 65. Specifically, the chain 26 is always placed under tension by the torsion coil spring 71.

The generator 29 is, for example, a well-known claw pole type, such as the one disclosed in the Official Gazette of Kokai Patent No.2000-069731, which is incorporated herein by reference in its entirety. However, in the working example of the present invention, because rear hub shaft 23 rotates, the generator 29 includes a claw pole type of coil, a magnet which is mounted onto the Rear hub shaft, and other parts. The generator 29 can be electrically connected to an optional battery (not shown) that is disposed on or within the skeleton frame 12.

The driving mechanism 30 is an apparatus which functions to assist the leg-power applied by means of the pedals 43 and 44. The driving mechanism includes a motor, a torque sensor which detects the torque operating on crank shaft 21, and a motor controller which controls the motor by means of output from the torque sensor. The driving mechanism 30 can be electrically connected to the battery (not shown) and to the generator 29.

Figure 7:
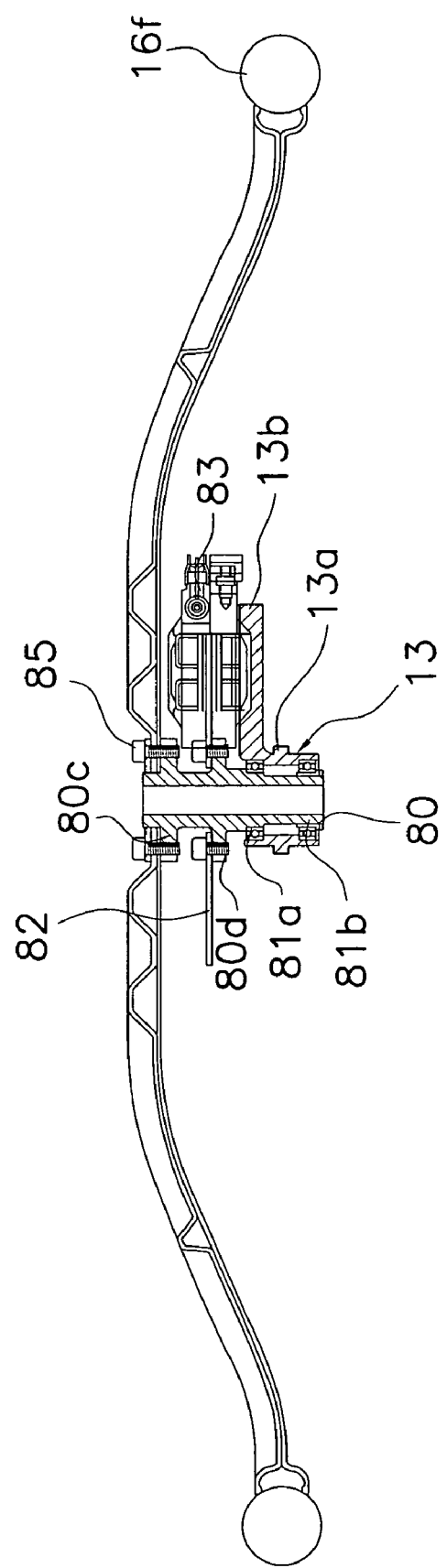
FIG. 7 is a cross-sectional top view of a front wheel support portion of the bicycle, in accordance with the present invention.

As shown in FIG. 7, the front wheel 16f is mounted to the distal end 13a of the suspension fork 13 in a freely rotatable manner. The distal end 13a of the suspension fork 13 includes features similar to those at the rearward portion of case frame 20. Specifically, a front hub shaft 80 of the front wheel 16f is supported on the distal end 13a of suspension fork 13 by two bearings 18a and 81b in a freely rotatable manner.

The front hub shaft 80 is formed with fifth and sixth support portions 80a and 80b, wheel support portion 80c and rotor support portion 80d. The bearings 81a and 81b installed on the fifth and sixth support portions 80a. The front wheel 16f is attached to the wheel support portion 80c by a plurality of mounting bolts 85. A disk rotor 82 of the front disk brakes 18f is attached to rotor support portion 80d via fasteners. The rotor support portion 80d is located between the fifth rotating support portion 80a and the wheel support portion 80c. Furthermore, the distal end 13a is equipped with a caliper support 13b that supports a caliper 83 of the front disk brake 18f. By structuring the front wheel 16f in this manner, it is possible to structure front wheel 16f and Rear Wheel 16r to be similarly structured with single-side supported wheels.

The front and rear disk brakes 18f and 18r are conventional designs that include calipers 61 and 83, respectively. The calipers 61 and 83 selectively engage the disk rotors 60 and 82 (respectively) to provide stopping force for the bicycle 10. Each of the calipers 61 and 83 includes a piston (not shown) causing engagement with the disk rotors 60 and 82.

In the drive unit 15, when the pedals 43 and 44 are pushed with the drive unit mounted onto the bicycle 10, the cranks 41 and 42 are rotated, which rotates the crank shaft 21. This rotates the front sprocket 22, which in turn rotates the rear sprocket 26 via the chain 26. Thereby, the rear wheel 16r is rotated moving the bicycle 10 forward.

Unlike conventional crank configurations, the front sprocket 22 of the present invention is not mounted on the crankshaft adjacent to a right-side crank. Further, the front sprocket 22 is not mounted in a location that is outward from support bearings. Rather, the front sprocket 22 is mounted between the support portions 21a and 21b, as shown in FIG. 3. Specifically, the front sprocket 22 is installed adjacent to the support portion 21b of the crankshaft 21. Consequently, the front sprocket 22 is located on the crankshaft 21 between the first and second bearings 33a and 33b. This arrangement is different from the structure observed in more conventional bicycles. As a result of new front sprocket 22 and bearings configuration, it is possible to reduce the distance between the first and second crank carrier portions 21c and 21d, compared with traditional crankshaft configurations. Further, because the distance between the first and second crank carrier portions 21c and 21d, and first and second bearings 33a and 33b is reduced, it is possible to reduce the mass of the crank shaft 21 and maintain rigidity and strength of the crank shaft 21. Specifically, it is possible to make the crank shaft 21 hollow.

Thus, it is possible to maintain an advantageous and desirable torsion angle, even if the rigidity of crank shaft 21 is reduced. Furthermore, the crank shaft 21 is supported by the forward portion of the first and second case components 31 and 32 at the first and second support portions 21a and 21b, and the rear hub shaft 23 is supported by the rearward portion of the first and second case components 31 and 32 at the third and fourth support portions 23a and 23b. Therefore, the length of the case frame 20 in the second direction becomes longer—in other words, the width becomes greater, which increases the torsional rigidity of the case frame 20. In the present invention, because the front sprocket 22 is installed between the first and second support portions 21a and 21b, it is possible to maintain strength and reduce the weight of the crank shaft 21. Furthermore, the crank shaft 21 and the rear hub shaft 23 are supported on forward and rearward portions of the case frame 20 by the first and second support portions 21a and 21b, and the third and fourth support portions 23a and 23b, respectively, which are spaced apart from one another. Therefore, it is possible to maintain a high level of torsional rigidity even with reduced mass and weight of the case frame 20. Thus, the weight of the entire the bicycle 10 can be reduced. Moreover, because the front sprocket 22 is installed between the first and second support portions 21a and 21b, the sealing structure around the crank shaft 21 is simplified increasing seal integrity. Moreover, because the rear sprocket 24 is installed between the third and fourth support portions 23a and 23b, the sealing structure of the rear hub shaft 23 is simplified, increasing seal integrity.

The drive unit 15 structured in the manner described above, is mounted onto a position on the skeleton frame 12 by means of the support bracket 35 so that the drive unit 15 moves in an undulating manner like a see-saw. The suspension unit 27 is mounted between the support bracket 35 and the mounting part 12a onto the skeleton frame 12, thus mounting the drive unit 15 onto the skeleton frame 12. With the drive unit 15 mounted, the drive unit 15 functions as a sealed oil and lubricated chain stay with a chain cover, in addition to being a suspension element of the bicycle 10. Therefore, such a drive unit prevents the chain 26 from staining clothes, requires little or no maintenance, and extends the life of the drive system. Furthermore, because the generator 29 and the drive mechanism 30 are built into the drive unit, these mechanisms can be utilized only by installing drive unit 15 onto the bicycle frame 11. Moreover, because both the front and rear wheels 16f and 16r are similarly structured so as to be supported only from one side, the front and rear wheels 16f and 16r can be easily replace or rotated by merely attaching and removing the mounting bolts 52 and 85. In other words, the front and rear wheels 16f and 16r are interchangeable.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

ALTERNATE EMBODIMENTS

Alternative embodiment will now be explained. In view of the similarity between the first and alternative embodiments, the parts of the alternative embodiments that are identical to the parts of the first embodiment will be given the same reference numerals as the parts of the first embodiment. Moreover, the descriptions of the parts of the alternative embodiment that are identical to the parts of the first embodiment may be omitted for the sake of brevity.

(a) Alternatively, any one or more of the rear gear shifter 28, the generator 29, and the drive mechanism 30 can be mounted outside of the case frame 20.

(b) Alternatively, the case frame 20 can be fixed to the skeleton frame 12 in a non-undulating manner.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle drive unit, comprising:

a case frame having a forward portion and a rearward portion, the forward portion being arranged and configured for mounting to a bicycle frame and the rearward portion arranged and configured for supporting a rear wheel of a bicycle, the case frame including first and second ease components defining an internal space therebetween, the case frame extending in lengthwise in a first direction, and having a width that extends in a second direction that is generally perpendicular to the first direction;

an undulation supporting bracket installed proximate the forward portion of the case frame, the undulation supporting bracket being arranged and configured for coupling the bicycle drive unit to a bicycle frame;

a suspension unit having a bicycle frame mounting end and a bracket mounting end, the bracket mounting end being mounted to a distal end of the undulation supporting bracket, the bicycle frame mounting end being arranged and configured for mounting to the bicycle frame to dampen undulating movement between the bicycle drive unit and the bicycle frame;

a crank shaft having first and second rotation supporting portions and first and second crank carrier portions, the first and second rotation supporting portions being spaced apart from one another, the first and second crank carrier portions being located on outward sides of the first and second rotation supporting portions respectively, the crank shaft extending generally in the second direction and supported by the first and second ease components in a freely rotatable manner, the first and second rotation supporting portions of the crank shaft being supported within the forward portion of the case frame, the first and second crank carrier portions extending outward from opposite sides of the case frame generally in the second direction;

a drive mechanism installed concentrically about the crank shaft within the case frame selectively providing rotational power to the crank shaft;

a first bearing mounted to the first rotational support portion of the crankshaft and to the forward portion of one of the first and second case components configured such that the crankshaft is freely rotatable relative to the forward portion of the one of the first and second case components;

a second bearing mounted to the second rotational support portion of the crankshaft and to the forward portion of the other of the first and second case components configured such that the crankshaft is freely rotatable relative to the forward portion of the other of the first and second case components;

a front sprocket non-rotatably mounted on the crank shaft within the case frame between the first and second rotation supporting portions and between the first and second bearings;

a rear hub shaft having third and fourth rotation supporting portions and a wheel support portion, the third and fourth rotation supporting portions being spaced apart from one another and installed within the rearward portion case frame extending generally in the second direction, the third and fourth rotation supporting portions being supported by the first and second case components in a freely rotatable manner, the wheel support portion extending outwardly from one of the third and fourth supporting portions and further extending outward from the first case component, the wheel support portion arranged and configured to support the rear wheel;

a rear sprocket mounted on the rear hub shaft in a freely rotatable manner and having one sprocket gear ring;

a one-way clutch that is arranged and configured to transmit rotational power from the rear sprocket to the rear hub shaft in one rotational direction only; and a chain installed on the front and rear sprockets for transmitting rotational power therebetween.

2. The bicycle drive unit as set forth in claim 1, wherein the rear sprocket is mounted to the rear hub shaft between the third rotation supporting portion and the fourth rotation supporting portion.

3. The bicycle drive unit as set forth in claim 1, wherein the rear sprocket comprises a plurality of axially spaced gears, and a chain guide derailleur, each of the axially spaced gears having a differing number of gear teeth and the chain guide derailleur being installed within an interior of the case frame.

4. The bicycle drive unit as set forth in claim 3, further comprising:

a chain tension assembly installed within the interior of the aforementioned case frame for retaining the chain on the rear sprocket and the front sprocket.

5. The bicycle drive unit as set forth in claim 4, wherein the rear hub shaft is further formed with a rotor support portion that is arranged and configured to non-rotatably support a disk rotor at a position between the third rotational supporting portion and the rear wheel support portion.

6. The bicycle drive unit as set forth in claim 5, wherein the case frame formed with a caliper support portion on an outer surface of the rearward portion, the caliper support portion being arranged and configured to support a brake disk caliper that selectively engages the disk rotor.

7. The bicycle drive unit as set forth in claim 1, wherein the rear hub shaft is further formed with a rotor support portion that is arranged and configured to non-rotatably support a disk rotor at a position between the third rotational supporting portion and the rear wheel support portion.

8. The bicycle drive unit as set forth in claim 7, wherein the case frame formed with a caliper support portion on an outer surface of the rearward portion, the caliper support portion being arranged and configured to support a brake disk caliper that selectively engages the disk rotor.

9. The bicycle drive unit as set forth in claim 1, further comprising:

a generator installed on the rear hub shaft within the case frame for generating electricity from rotation of the rear hub shaft.

10. A bicycle drive unit, comprising:

a case frame having a forward portion and a rearward portion, the forward portion being arranged and configured for mounting to a bicycle frame and the rearward portion arranged and configured for supporting a rear wheel of a bicycle, the ease frame including first and second case components defining an internal space therebetween, the case frame extending in lengthwise in a first direction, and having a width that extends in a second direction that is generally perpendicular to the first direction;

an undulation supporting bracket installed proximate the forward portion of the case frame, the undulation supporting bracket being arranged and configured for coupling the bicycle drive unit to a bicycle frame;

a suspension unit having a bicycle frame mounting end and a bracket mounting end, the bracket mounting end being mounted to a distal end of the undulation supporting bracket, the bicycle frame mounting end being arranged and configured for mounting to the bicycle frame to dampen undulating movement between the bicycle drive unit and the bicycle frame;

a crank shaft having first and second bearing supporting portions and first and second ends configured to receive crank arms, the first and second bearing supporting portions being spaced apart from one another, the crank shaft extending generally in the second direction and supported by the first and second case components in a freely rotatable manner by bearings installed on the first and second bearing supporting portions, the first and second bearing supporting portions of the crank shaft being supported within the forward portion of the case frame, the first and second ends extending outward from opposite sides of the case frame generally in the second direction;

a first bearing mounted to the first rotational support portion of the crankshaft and to the forward portion of one of the first and second case components configured such that the crankshaft is freely rotatable relative to the forward portion of the one of the first and second case components;

a second bearing mounted to the second rotational support portion of the crankshaft and to the forward portion of the other of the first and second case components configured such that the crankshaft is freely rotatable relative to the forward portion of the other of the first and second case components;

a front sprocket non-rotatably mounted on the crank shaft within the case frame between the first and second bearing supporting portions and between the first and second bearings;

a rear hub shaft having third and fourth bearing supporting portions and a wheel support portion, the third and fourth bearing supporting portions being spaced apart from one another and installed within the rearward portion case frame extending generally in the second direction, the third and fourth bearing supporting portions being supported by the first and second ease components in a freely rotatable manner by bearings mounted to the third and forth bearing supporting portions, the wheel support portion extending outwardly from one of the third and fourth bearing supporting portions and further extending outward from the first ease component, the wheel support portion arranged and configured to support the rear wheel;

a rear sprocket mounted on the rear hub shaft in a freely rotatable manner and having one sprocket gear ring;

a one-way clutch that is arranged and configured to transmit rotational power from the rear sprocket to the rear hub shaft in one rotational direction only; and a chain installed on the front and rear sprockets for transmitting rotational power therebetween.

11. The bicycle drive unit as set forth in claim 10, further comprising:

a drive mechanism installed concentrically about the crank shaft within the case frame selectively providing rotational power to the crank shaft.

12. The bicycle drive unit as set forth in claim 10, wherein the rear sprocket is mounted to the rear hub shaft between the third bearing supporting portion and the fourth bearing supporting portion.

13. The bicycle drive unit as set forth in claim 10, wherein the rear sprocket comprises a plurality of axially spaced gears, and a chain guide derailleur, each of the axially spaced gears having a differing number of gear teeth and the chain guide derailleur being installed within an interior of the case frame.

14. The bicycle drive unit as set forth in claim 13, farther comprising:

a chain tension assembly installed within the interior of the aforementioned case frame for retaining the chain on the rear sprocket and the front sprocket.

15. The bicycle drive unit as set forth in claim 14, wherein the rear hub shaft is further formed with a rotor support portion that is arranged and configured to non-rotatably support a disk rotor at a position between the third bearing supporting portion and the rear wheel support portion.

16. The bicycle drive unit as set forth in claim 15, wherein the case frame formed with a caliper support portion on an outer surface of the rearward portion, the caliper support portion being arranged and configured to support a brake disk caliper that selectively engages the disk rotor.

17. The bicycle drive unit as set forth in claim 10, wherein the rear hub shaft is further formed with a rotor support portion that is arranged and configured to non-rotatably support a disk rotor at a position between the third bearing supporting portion and the rear wheel support portion.

18. The bicycle drive unit as set forth in claim 17, wherein the case frame formed with a caliper support portion on an outer surface of the rearward portion, the caliper support portion being arranged and configured to support a brake disk caliper that selectively engages the disk rotor.

19. The bicycle drive unit as set forth in claim 10, further comprising:

a generator installed on the rear hub shaft within the case frame for generating electricity from rotation of the rear hub shaft.

* * * * *